(12) United States Patent
Maekawa

(10) Patent No.: US 8,890,450 B2
(45) Date of Patent: Nov. 18, 2014

(54) MOTOR CONTROL DEVICE

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 133 days.

(21) Appl. No.: 13/607,984

(22) Filed: Sep. 10, 2012

(65) Prior Publication Data

US 2013/0069572 A1 Mar. 21, 2013

(30) Foreign Application Priority Data

Sep. 15, 2011 (JP) ................................. 2011-201774

(51) Int. Cl.
  *H02P 21/00* (2006.01)
  *H02P 6/18* (2006.01)
(52) U.S. Cl.
  CPC .............. *H02P 6/18* (2013.01); *H02P 21/0042* (2013.01)
  USPC .................. 318/400.02; 318/400.26; 318/724
(58) Field of Classification Search
  USPC ........ 318/254, 138, 439, 724, 400.26, 400.02
  See application file for complete search history.

(56) References Cited

U.S. PATENT DOCUMENTS

| 7,190,130 | B2 * | 3/2007 | Wogari et al. ............. | 318/400.02 |
| 8,102,141 | B2 * | 1/2012 | Nagai et al. .................... | 318/766 |
| 8,143,838 | B2 * | 3/2012 | Akiyama ....................... | 318/807 |
| 8,159,161 | B2 * | 4/2012 | Tomigashi ............... | 318/400.02 |
| 8,159,163 | B2 * | 4/2012 | Akiyama ................. | 318/400.11 |
| 8,390,223 | B2 * | 3/2013 | Nakamura et al. ....... | 318/400.01 |
| 8,541,971 | B2 * | 9/2013 | Sakai et al. .................... | 318/599 |
| 8,547,041 | B2 * | 10/2013 | Furukawa et al. ....... | 318/400.02 |
| 8,674,652 | B2 * | 3/2014 | Maekawa ..................... | 318/811 |
| 2005/0047762 | A1 * | 3/2005 | Liu et al. .................... | 388/806 |
| 2007/0296371 | A1 * | 12/2007 | Aoki ............................. | 318/700 |
| 2010/0117586 | A1 | 5/2010 | Akiyama | |
| 2010/0320950 | A1 * | 12/2010 | Inoue et al. .............. | 318/400.26 |

FOREIGN PATENT DOCUMENTS

| CN | 102005996 A | 4/2011 |
| JP | 2004-129410 | 4/2004 |
| JP | 2006-230056 | 8/2006 |
| JP | 2007-336641 | 12/2007 |

OTHER PUBLICATIONS

Notification of Reasons for Refusal issued Sep. 3, 2013 in Japanese Patent Application No. 2011-201774 (with English translation).
Office Action issued Jul. 2, 2014, in Chinese Patent Application 2014062800213500 (with English translation).

* cited by examiner

*Primary Examiner* — Eduardo Colon Santana
*Assistant Examiner* — Bickey Dhakal
(74) *Attorney, Agent, or Firm* — Oblon, Spivak, McClelland, Maier & Neustadt, L.L.P.

(57) ABSTRACT

A motor control device includes an inverter circuit having switching elements on/off controlled according to a predetermined PWM signal pattern to convert an input direct current to three-phase alternating current supplied to drive an electric motor. A phase current of the motor is detected based on a detection of the input direct current and the PWM signal pattern. A PWM signal generation unit which generates a three-phase PWM signal pattern to enable detecting two-phase currents twice in synchronization with four time-points within a carrier wave period of the PWM signal respectively and so that a detection of current follows a magnetic pole position of the motor. A current differential unit supplies, as current differential values, differences between twice detected current values regarding the two phases respectively, and a magnetic pole position estimation unit estimates the magnetic pole position of the motor based on the current differential values.

15 Claims, 16 Drawing Sheets

MAGNETIC POLE POSITION
2θ

V PHASE CURRENT
DIFFERENTIAL COMPONENT

W PHASE CURRENT
DIFFERENTIAL COMPONENT

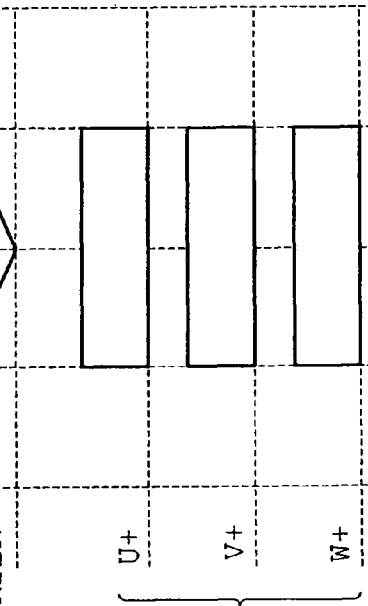

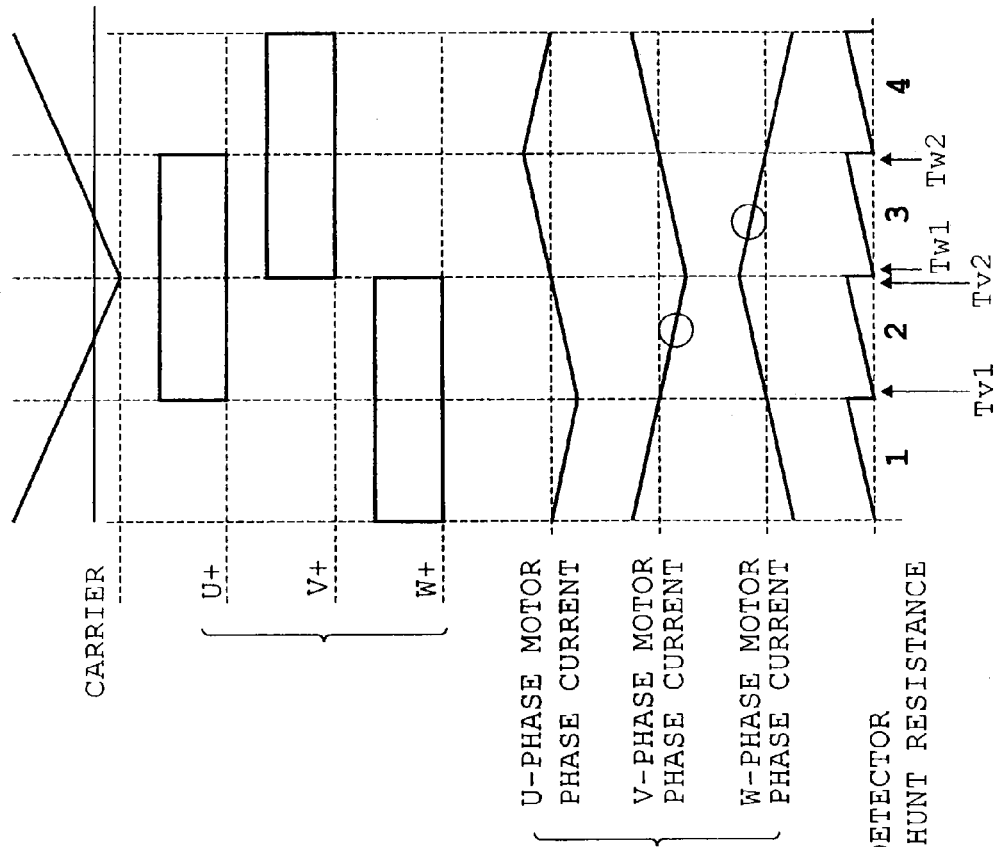

| U-PHASE HI-SIDE FET | V-PHASE HI-SIDE FET | W-PHASE HI-SIDE FET | MOTOR CURRENT DETECTED BY SHUNT RESISTANCE |
| --- | --- | --- | --- |
| ON | OFF | OFF | +Iu |
| ON | ON | OFF | -Iw |
| OFF | ON | OFF | +Iv |
| OFF | ON | ON | -Iu |
| OFF | OFF | ON | +Iw |
| ON | OFF | ON | -Iv |
| OFF | OFF | OFF | UNDETECTABLE |
| ON | ON | ON | UNDETECTABLE |

FIG. 6

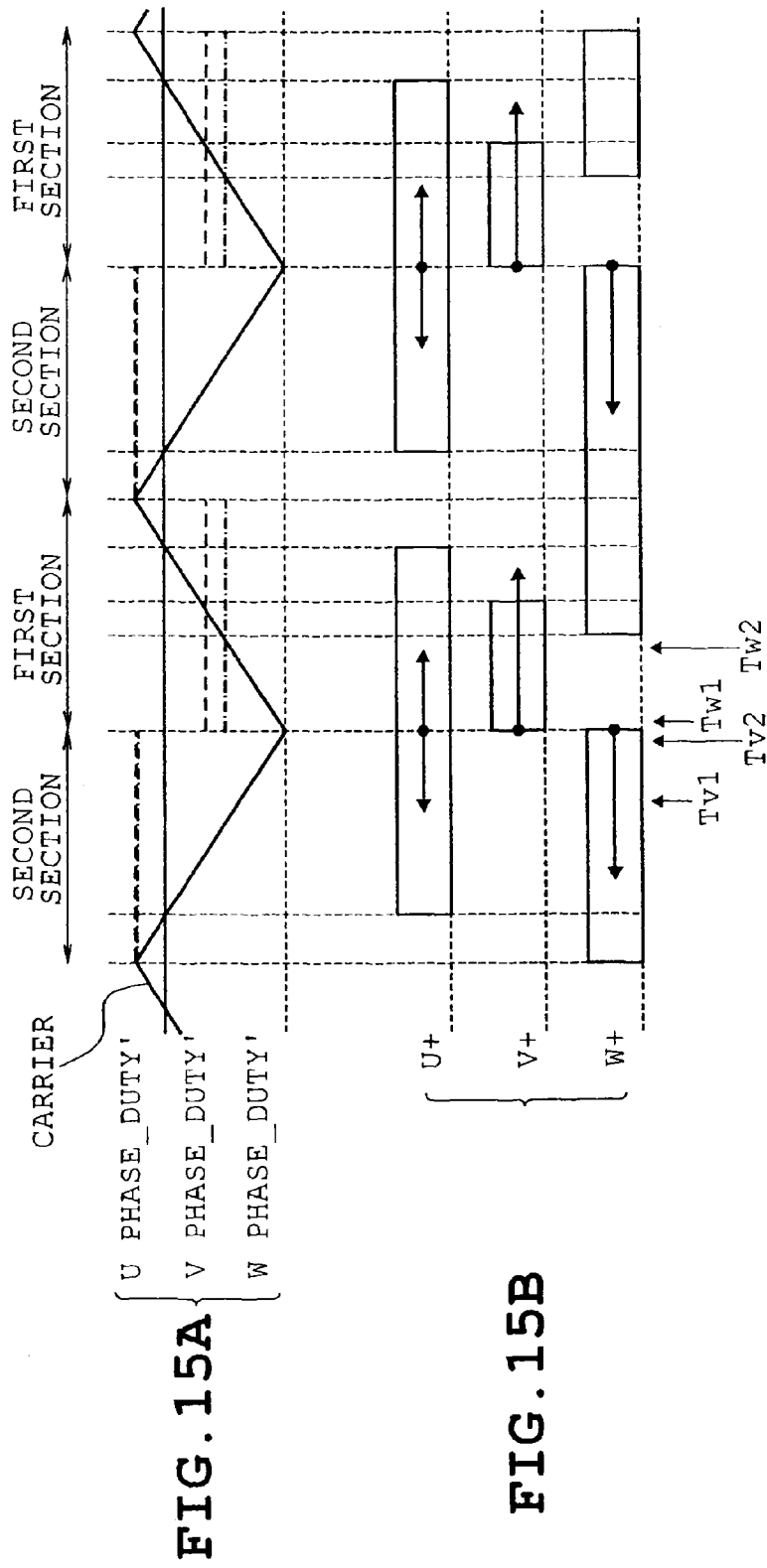

CONVERSION OF SET VALUE OF FIRST SECTION

| U PHASE_DUTY' | V PHASE_DUTY' | W PHASE_DUTY' |
|---|---|---|
| U PHASE_DUTY | WHEN V PHASE DUTY × 2 < CARRIER MAX VALUE → 2 × V PHASE DUTY  OR ELSE → CARRIER MAX VALUE | WHEN W PHASE DUTY × 2 < CARRIER MAX VALUE → CARRIER MAX VALUE  OR ELSE → 2 × CARRIER MAX VALUE − 2 × W PHASE DUTY |

CONVERSION OF SET VALUE OF FIRST SECTION

| U PHASE_DUTY' | V PHASE_DUTY' | W PHASE_DUTY' |
|---|---|---|
| U PHASE_DUTY | WHEN V PHASE DUTY × 2 < CARRIER MAX VALUE → CARRIER MAX VALUE  OR ELSE → 2 × CARRIER MAX VALUE − 2 × V PHASE DUTY | WHEN W PHASE DUTY × 2 < CARRIER MAX VALUE → W PHASE DUTY × 2  OR ELSE → CARRIER MAX VALUE |

FIG.16

MOTOR CONTROL DEVICE

CROSS-REFERENCE TO RELATED APPLICATIONS

This application is based upon and claims the benefit of priority from Japanese Patent Application No. 2011-201774, filed Sep. 15, 2011, the entire contents of which are incorporated herein by reference.

FIELD

Embodiments described herein relate to a motor control device which detects a phase current by a current detecting device arranged in a direct current part of an inverter circuit to detect phase currents.

BACKGROUND

As one of conventional systems of estimating a position of magnetic pole of an electric motor, an induced voltage proportional to a rotational speed of the motor is computed based on an input voltage and an input current of the motor. A magnetic pole position is estimated based on the obtained induced voltage. This estimation system is widely used. Furthermore, an AC signal is superposed on a voltage command value, so that an estimated current is analyzed by a First Fourier Transform analysis, whereby a rotational speed and a magnetic pole position of the motor are estimated. However, an accurate estimation cannot be obtained in a very low speed range although this method can achieve a sufficient accuracy in a high speed range having less amount of information about an induced voltage.

In view of the above problem, several systems have been proposed in which a sensing AC signal that is not involved in a drive frequency is applied to a motor so that a rotor position is estimated from a relationship between voltage and current. However, application of a sensing signal necessitates a particular signal generator, resulting in a complicate control manner.

In further another system differing from the above-described ones, a position of magnetic pole is estimated using a current of high frequency components or carrier frequency components both contained in an inverter output without application of a particular sensing signal. In the former, inductance is computed from high frequency current contained in PWM inverter output. The magnetic pole position is estimated on the basis of the obtained inductance. In the latter, a phase difference of 120° is caused in carrier signals of the PWM inverter between two of three phases U, V and W, so that a carrier frequency component voltage and a carrier frequency component current both other than a drive frequency are generated. Based on a supposition that voltage is constant during a carrier period, the magnetic pole position is estimated using only the carrier frequency component current.

In the above-described magnetic pole position estimating system, a high frequency current flowing due to a high frequency voltage is a disturbance against a voltage of fundamental components of the inverter output. However, since the carrier frequency is sufficiently high relative to a rotational speed of the motor, the aforesaid high frequency current is not a disturbance against torque. Furthermore, a low pass filter or the like needs to be added to a current feedback value in the magnetic pole position estimation, whereupon the responsiveness of the control system can advantageously be improved.

However, from the viewpoint of practical use, the magnitude of the high frequency current depends upon parameters of the motor and accordingly, influences of the high frequency current differ depending upon motors to be used, whereupon it would be difficult to apply the magnetic pole position estimating system to various types of systems in a versatile manner.

BRIEF DESCRIPTION OF THE DRAWINGS

FIGS. 4A to 4D show each phase duty cycle pulse, respective phase currents and a current detected by a shunt resistance in one period of PWM control, respectively;

FIGS. 5A to 5D are views similar to FIGS. 4A to 4D, showing the case where each phase duty cycle pulse has been changed, respectively;

FIG. 6 shows a list of phase currents detected by a DC current detector depending upon ON/OFF states of switching elements of the inverter circuit;

FIGS. 15A and 15B are views similar to FIGS. 9A to 9D; and

FIG. 16 shows logic of duty cycle conversion executed by a pulse generation.

DETAILED DESCRIPTION

According to one embodiment, a motor control device comprises an inverter circuit including a plurality of switching elements which is connected into a three-phase bridge configuration, the switching elements being on/off controlled according to a predetermined PWM signal pattern so that direct current is converted to three-phase alternating current, which is supplied to drive an electric motor. A current detecting element is connected to a direct current side of the inverter circuit to generate a signal corresponding to a current value. A current detection unit detects a phase current of the motor based on the signal generated by the inverter circuit and the PWM signal pattern. A PWM signal generation unit generates a three-phase PWM signal pattern so that the current detection unit is capable of detecting two-phase currents twice in synchronization with four time-points within a carrier wave period of the PWM signal respectively and so that the current detection unit follows a magnetic pole position of the motor. A current differential unit supplies, as current differential values, differences between twice detected current values regarding the two phases respectively. A magnetic pole position estimation unit estimates a magnetic pole position of the motor based on the current differential values.

In the motor control device, the PWM signal generation unit increases/decreases a duty cycle in both directions of phase lag and phase lead with an arbitrary phase within the carrier wave period serving as a reference regarding one phase of the three-phase PWM signal. The PWM signal generation unit increases/decreases the duty cycle in one of both directions of phase lag and phase lead with an arbitrary phase within the carrier wave period serving as a reference regarding another phase of the three-phase PWM signal. The PWM signal generation unit increases/decreases the duty cycle in a direction opposed to said one of both directions of phase lag and phase lead with an arbitrary phase within the carrier wave period serving as a reference regarding the remaining phase of the three-phase PWM signal.

Figure 1:
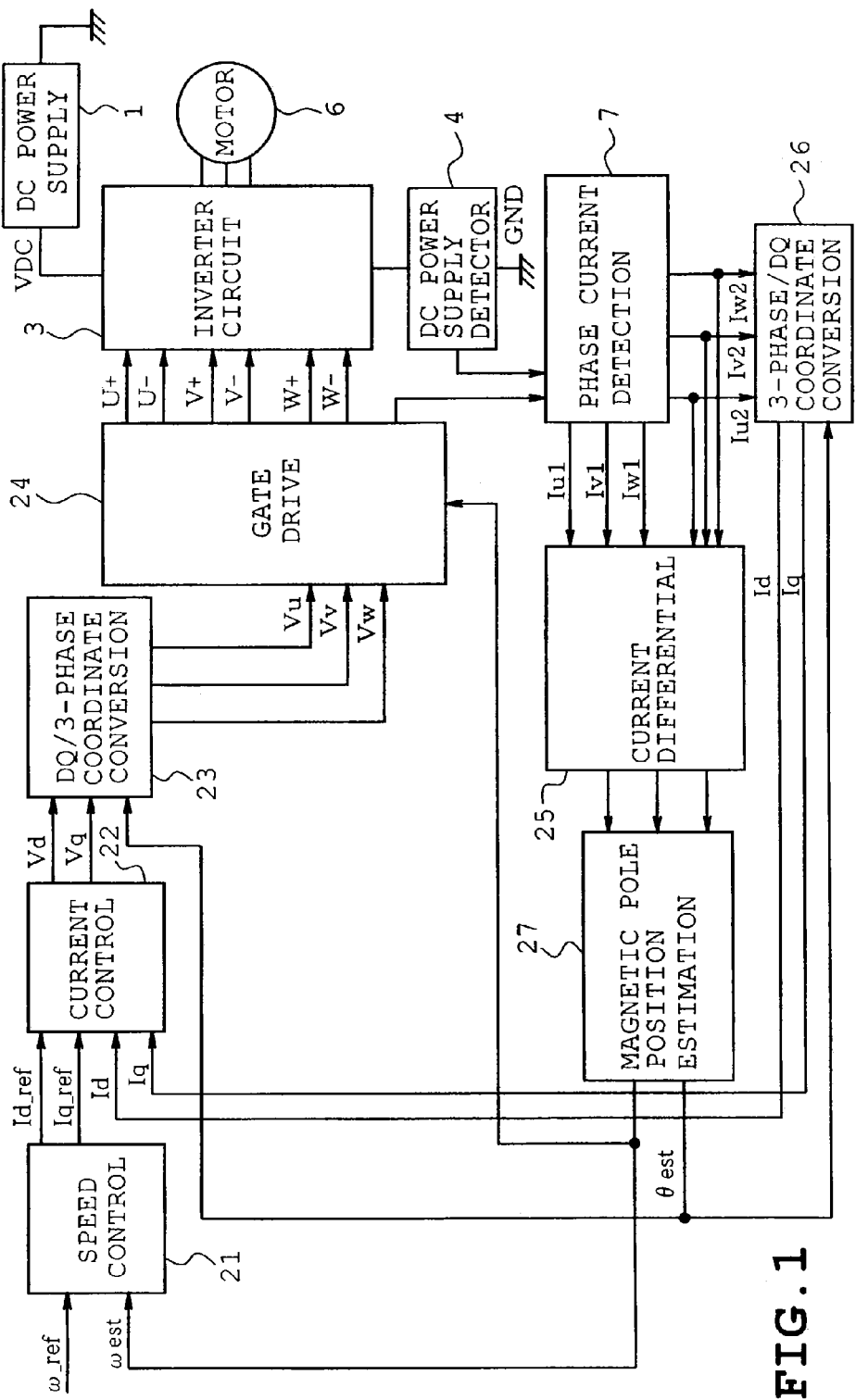
FIG. 1 is a functional block diagram showing an electrical arrangement of the motor control device according to a first embodiment.

A first embodiment will be described with reference to FIGS. 1 to 9D. Referring to FIG. 1, an electrical arrangement of the motor control device of the first embodiment is shown. The motor control device includes a speed control 21 which executes a proportional-integral (PI) control or a proportional-integral-derivative (PID) control regarding a difference between an externally supplied speed command ω_ref and a rotational speed ω of an electric motor 6 estimated by a magnetic pole position estimation 27 which will be described later, thereby generating current commands Id_ref and Iq_ref and supplying the current commands to a current control 22. The d-axis current command Id_ref is set to zero when the motor 6 is a permanent magnet motor such as brushless DC motor and executes a full field operation.

The current control 22 executes the PI or PID control regarding differences between the current command and d-axis current Id and q-axis current Iq both supplied from a three-phase/d-q coordinate conversion 26 which will be described later, in the same manner as carried out by the speed control 21, thereby generating voltage commands Vd and Vq and supplying the voltage commands to a d-q/three phase coordinate conversion 23. The d-q/three phase coordinate conversion 23 converts the d-axis and q-axis voltage commands Vd and Vq to corresponding three-phase voltage commands Vu, Vv and Vw by a magnetic pole position θ$_{est}$ of the motor 6 estimated by a magnetic pole position estimation 27, supplying the three-phase voltage commands to a gate drive 24.

Figure 7:
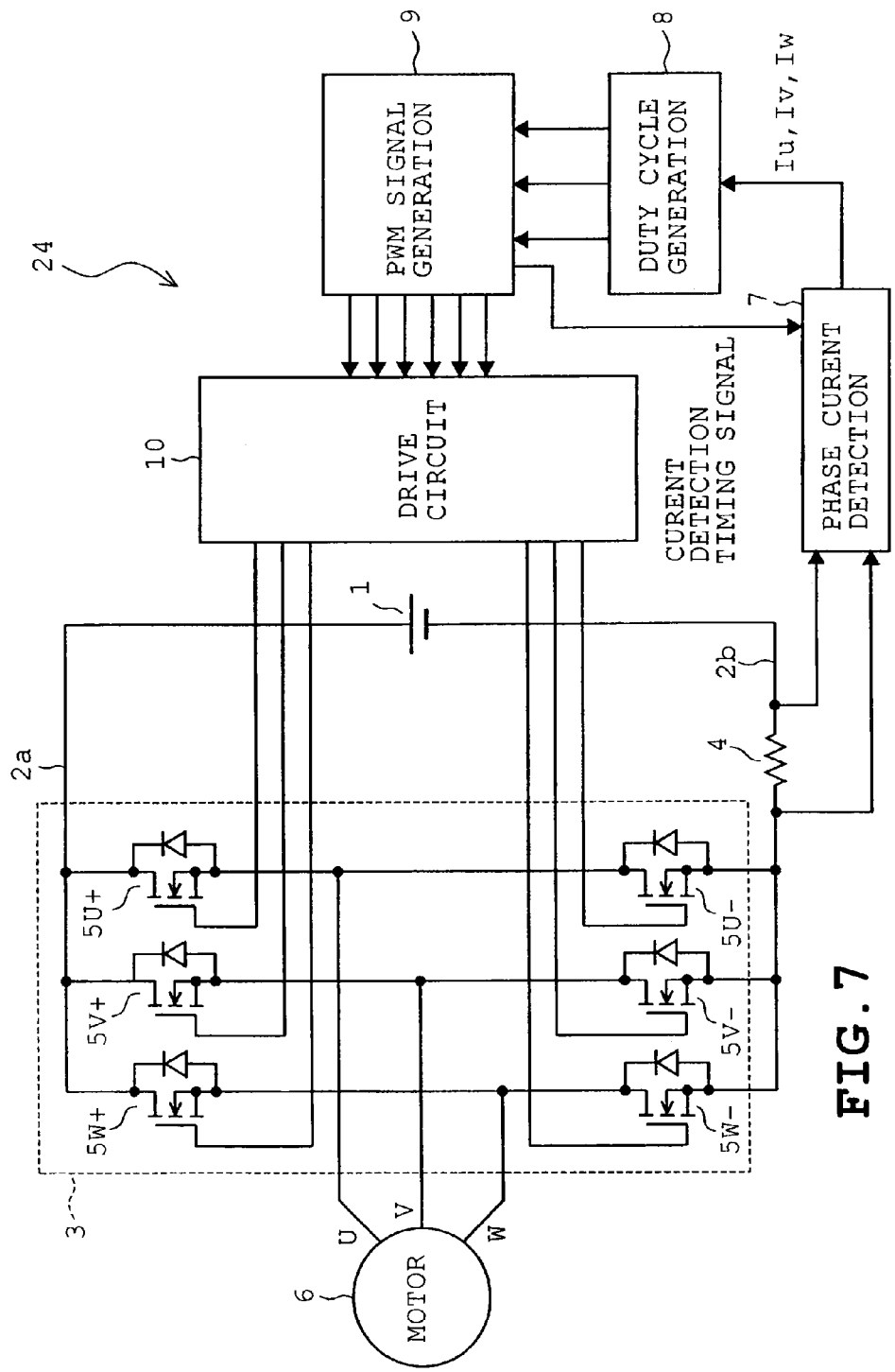
FIG. 7 is a functional block diagram showing the configuration of the motor control device of FIG. 1 in more detail with a central focus on the inverter circuit and a gate drive.

The gate drive 24 generates three-phase PWM signals based on the three-phase voltage commands Vu, Vv and Vw and supplies gate drive signals to respective phase switching elements, an FET 5U±, an FET 5V± and an FET 5W± (see FIG. 7). An internal arrangement of the gate drive 24 will be described later. The inverter circuit 3 is supplied with a direct-current (DC) power supply 1 generated by rectifying and smoothing an alternating-current (AC) power supply. When supplied with the gate drive signals, the inverter circuit 3 drives the motor 6. A DC current detector 4 is provided in a DC part of the inverter circuit 3, for example, in a negative bus bar and supplies to a phase current detection 7 a detection signal of DC current flowing into the inverter circuit 3.

The gate drive 24 supplies to the phase current detection 7 a current detection timing signal that is synchronous with a period of PWM carrier wave. Based on the current detection timing signal, the phase current detection 7 detects respective phase currents twice within one carrier wave period, thereby supplying the detected currents Iu$_1$, Iv$_1$ and Iw$_1$ and Iu$_2$, Iv$_2$ and Iw2 to a current differential (a current differential unit) 25 and further supplying the detected currents Iu$_2$, Iv$_2$ and Iw$_2$ to the three-phase/d-q coordinate conversion 26. The current differential 25 obtains differences between detected currents I2 and I1 for respective phases, thereby supplying the obtained differences (current differentials, high-frequency currents) to the magnetic pole position estimation 27. The magnetic pole position estimation 27 computes current differentials for respective phases to estimate a magnetic pole position θ$_{est}$ and speed ω$_{est}$. The estimated magnetic pole position θ$_{est}$ is supplied to the d-q/three phase coordinate conversion 23 and the three-phase/d-q coordinate conversion 26, and the estimated speed ω$_{est}$ is supplied to the speed control 21 and the gate drive 24. Furthermore, the three-phase/d-q coordinate conversion 26 converts the detected currents I2 to d-axis and q-axis currents I$_d$ and I$_q$ by the magnetic pole position θ$_{est}$, supplying the currents I$_d$ and I$_q$ to the current control 22.

The following describes a manner of estimating a magnetic pole position and a current detecting manner that is a precondition to the estimating manner, with reference to FIGS. 4A to 6. For example, when duty cycles of three-phase PWM signals are uniformly 50%, three-phase duty cycle pulses as shown in FIG. 4B are obtained from duty cycle generation by an ordinary triangle wave comparison method. Pulse-generation reference phases and directions in which duty cycles of the respective phases are increased/decreased are common to the phases, this corresponds to a state where all phases of the inverter circuit 3 are ON or OFF. In this case, no voltage is applied between phase terminals of the motor 6 throughout the period (one period in the PWM control period), whereupon phase currents are zero (see FIGS. 4C and 4D).

On the other hand, in the embodiment, pulses are generated in the gate drive 24 as shown in FIG. 5 so that a phase in which each phase duty cycle pulse is generated differs from the case of FIGS. 4A-4C. This manner is employed in order that detecting two phase currents twice within one period of PWM control may be realized. FIG. 5A shows a triangle wave as the PWM carrier. A bottom of the triangle wave serves as a central phase of the period. Alternatively, a triangle wave with the central phase becoming a peak, that is, a triangle wave having reverse phase waveform may be employed.

When the pulse width of U-phase pulse is increased with the aforementioned central phase serving as a reference phase, duty cycle pulses are generated so that the pulse extends to both sides (the phase lag side and the phase lead side). Furthermore, when the pulse widths of V-phase and W-phase pulses are increased with the central phase serving as a reference phase, duty cycle pulses are generated so that the pulses extend rightward (to the phase lead side) and leftward (to the phase lag side) respectively (see FIG. 5B). In this case, when inter-terminal voltages of respective phases of the motor 6 are taken into consideration, one period as shown in FIGS. 5A to 5D is divided into four sections 1 to 4. Since only W phase is ON in section 1, DC voltage VDC is applied between W and U phases and between W and V phases and a W-phase current is increased at a gradient due to inductance of the motor 6. In this case, since negative voltage is applied to U-phase and V-phase terminals, U-phase and V-phase currents are decreased.

U and W phases are ON in the section 2. Accordingly, DC voltage VDC is applied between U and V phases and between W and V phases and U-phase and W-phase currents are increased, while a V-phase current is decreased. As a total of sections 1 to 4, an average current of each phase becomes zero as the result of increase and/or decrease of each phase current and becomes a motor current similar to the PWM pattern as shown in FIG. 4. Each phase current differs from the PWM pattern in that each phase includes ripple of the carrier frequency. More specifically, high frequency current amplitude of the carrier frequency can be changed when a generation phase of three-phase PWM duty cycle pulses is shifted as shown in FIGS. 5A-5D.

The following describes a manner of detecting three-phase motor currents from the DC current detector 4 disposed in a direct current side of the inverter circuit 3. Current flowing into the DC current detector 4 changes depending upon ON/OFF states of the phases. FIG. 6 shows a list of phase currents detected by the DC current detector 4. In the case of the PWM pattern as shown in FIGS. 5A-5D, V-phase and W-phase currents flow with positive or negative polarity. When at least two phase currents are detected in the sections, the other phase current can be obtained from computation in which a sum total of three phase currents becomes zero, whereupon the three-phase currents are detectable.

In the embodiment, ON/OFF states of the three phases are detected at both sides of the bottom of the reference carrier (the triangle wave), that is, V-phase and W-phase currents are detected in sections 2 and 3. In this case, a negative polarity W-phase current can be detected when a current value is sampled at any point of section 2. However, since a current differential or difference value is obtained for the purpose of detecting a magnetic pole position of the motor 6 in the embodiment, sampling is carried out at two points near start and end of the section 2. A difference between current values sampled at the two points serves as a W-phase current differential value. In the same manner, a difference between current values sampled at two points near start and end of section 3 serves as a V-phase current differential value.

An arrangement for generating PWM duty cycle pulses in the pattern as shown in FIGS. 5A-5D will now be described with reference to FIGS. 7 to 9D. FIG. 7 shows a configuration of the motor control device of FIG. 1 in more detail with a central focus on the inverter circuit 3 and the gate drive 24. The inverter circuit 3 is connected via a positive bus bar 2a and a negative bus bar 2b to the DC power supply 1. A shunt resistance 4R which is a current detecting element serving as a DC current detector 4 is inserted into the negative bus bar 2b side. The inverter circuit 3 is constituted, for example, by n-channel power MOSFETs 5U+, 5V+, 5W+, 5U−, 5V− and 5W− connected into a three-phase bridge configuration. Three-phase output terminals of the MOSFETs 5 are connected to three-phase windings of the motor 6 respectively.

A terminal voltage (a signal according to current value) of the shunt resistance 4R is detected by a current detection 7, which detects currents Iu, Iv and Iw of U-, V- and W-phases respectively, based on the terminal voltage and a three-phase PWM signal pattern supplied to the inverter circuit 3. The phase currents detected by the current detection 7 are supplied to a duty cycle generation 8, which carries out an A/D conversion of the supplied phase currents and reads the converted currents. The duty cycle generation 8 further caries out computation based on control conditions of the motor 6 and the like. As a result, the duty cycle generation 8 determines duty cycles U_DUTY, V_DUTY and W_DUTY to generate three-phase PWM signals. In FIG. 7, the flow of control shown in FIG. 1 is eliminated in the flow of determination of three-phase duty cycles by the duty cycle generation 8 on the basis of phase currents detected by the current detection 7.

The phase duty cycles U_DUTY, V_DUTY and W_DUTY are supplied to a PWM signal generation (a PWM signal generation unit) 9, which compares the phase duty cycles with the levels of the carrier waves thereby to generate three-phase PWM signals. Furthermore, PWM signals for the lower arm side are also generated by inverting the three-phase PWM signals, and dead time is added to the generated PWM signals when necessary. Thereafter, the PWM signals are supplied to a drive circuit 10, which supplies gate signals to respective gates of the six power MOSFETs 5U+, 5V+, 5W+, 5U−, 5V− and 5W− constituting the inverter circuit 3. The gate signals to be supplied to the upper arm side have respective potentials increased or stepped up by a necessary level.

Figure 8:
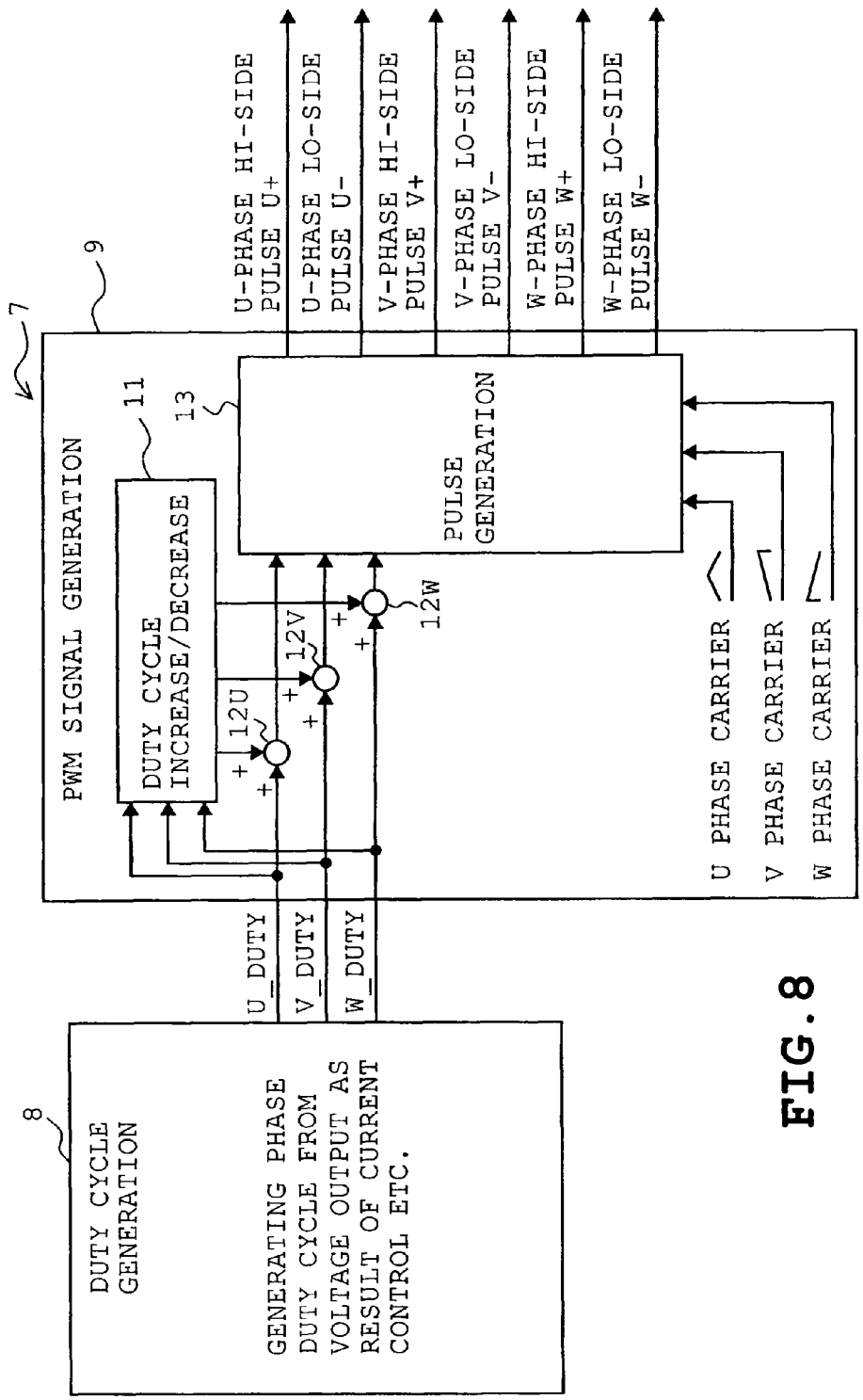
FIG. 8 is a functional block diagram showing an internal configuration of the PWM signal generation.
Figure 9:
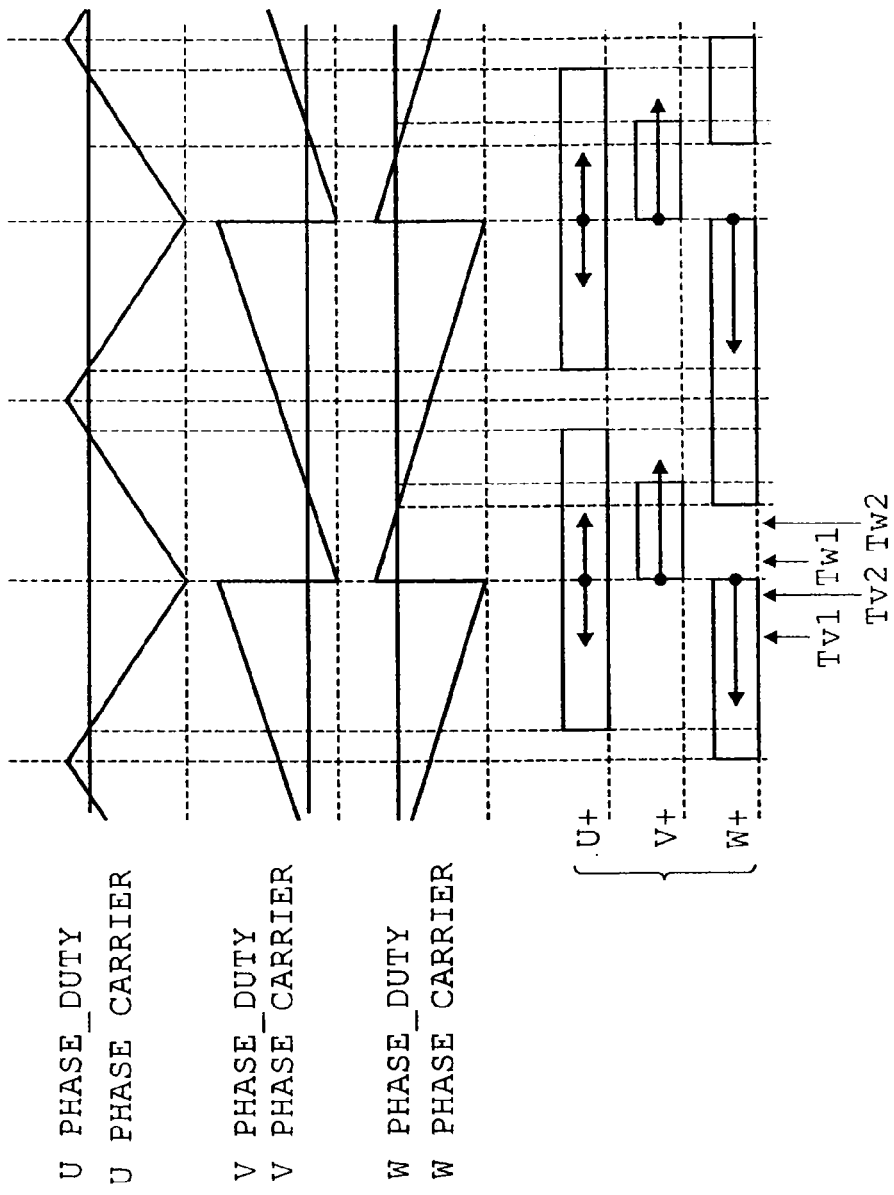
FIGS. 9A to 9D are timing charts showing generation of upper arm side three-phase PWM signals.

FIG. 8 shows the internal configuration of the PWM signal generation, and FIGS. 9A to 9D show generation of pulses of upper arm side three-phase PWM signals (U+, V+ and W+). When additional values are supplied from a duty cycle increase/decrease 11, duty cycles are added via adders 12U, 12V and 12W to the three-phase duty cycles U_DUTY, V_DUTY and W_DUTY. The addition of duty cycles will be described in detail in a second embodiment. Output signals of the adders 12U, 12V and 12W are supplied to the pulse generation 13 to be compared with the levels of carriers of U-, V- and W-phases (carrier waves), whereupon three-phase PWM signals U±, V± and W± are generated.

More specifically, the three-phase carriers having different waveforms are used in the embodiment. The U-phase carrier is a triangle wave, the V-phase carrier is a saw-tooth wave and the W-phase carrier is a saw-tooth wave having a reverse phase relative to the V-phase carrier, as shown in FIGS. 9A to 9C. The U-phase, V-phase and W-phase carriers are supplied so that the phase in which an amplitude level of the U-phase carrier becomes minimum, the phase in which an amplitude level of the V-phase carrier becomes minimum and the phase in which an amplitude level of the W-phase carrier becomes maximum correspond with one another. These carriers can be generated by three counters which synchronously carry out respective counting operations. An up/down counter is employed for the U phase, an up counter is employed for the V phase, and a down-counter is employed for the W phase. However, the frequency at which the up/down counter carries out a counting operation is twice as high as the frequencies of the other counters. A period of each carrier is set at 50 µsec, for example.

The pulse generation 13 compares the phase duty cycles U_DUTY, V_DUTY and W_DUTY with levels of the phase carriers respectively, thereby supplying high-level pulses in each period when duty cycle is larger than carrier. Consequently, when the minimum amplitude phase (a trough of the triangle wave) of the U-phase carrier is a reference phase, the pulse width of U-phase PWM signal pulse U+ is changed so as to be increased/decreased from the reference phase in both directions of phase lag and phase lead, as shown in FIG. 9D. The pulse width of V-phase PWM signal pulse V+ is changed so as to be increased/decreased from the reference phase in the direction of phase lead (rightward in FIG. 9D). The pulse width of W-phase PWM signal pulse W+ is changed so as to be increased/decreased from the reference phase in the direction of phase lag (leftward in FIG. 9D).

The PWM signal generation 9 supplies a current detection timing signal (the U-phase carrier, for example) to the current detection 7, which then determines timing (time-points) of two-phase currents according to the current detection timing signal. Current detection is carried out four times in one period in synchronization with time-points Tv1 and Tv2 for detection of V-phase current and time-points Tw1 and Tw2 for detection of W-phase current. For example, the time-points Tv1 and Tv2 are set within a period from time of start of down-count to the time before reach of count value to zero with the maximum amplitude phase of U-phase carrier serving as a reference phase. The time-points Tw1 and Tw2 are set within a period between change from down-count to up-count with the count value having reached zero and the time before the count value reaches the maximum. The difference of V-phase current (−) Iv and the difference of W-phase current (−) Iw is detectable as the result of the above-described manner of setting the detection timing (time-points). The carrier to which the current detection 7 refers for determination of current detection timing should not be limited to U phase but may be a V- or W-phase carrier.

Figure 3A:
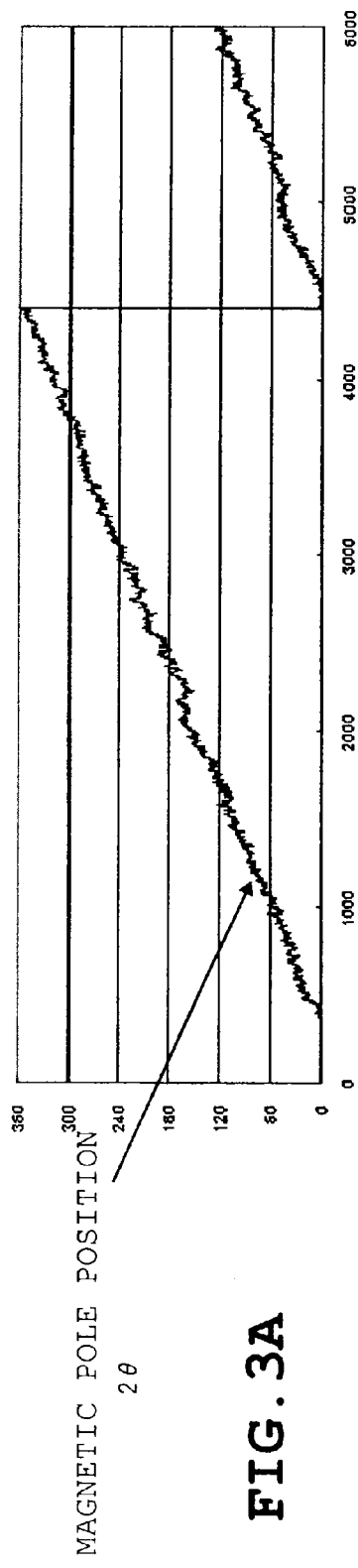
FIGS. 3A and 3B are graphs showing a motor magnetic pole position detected by a position sensor and two phase current differential values in the application of a PWM signal pattern of the embodiment, respectively.
Figure 3B:
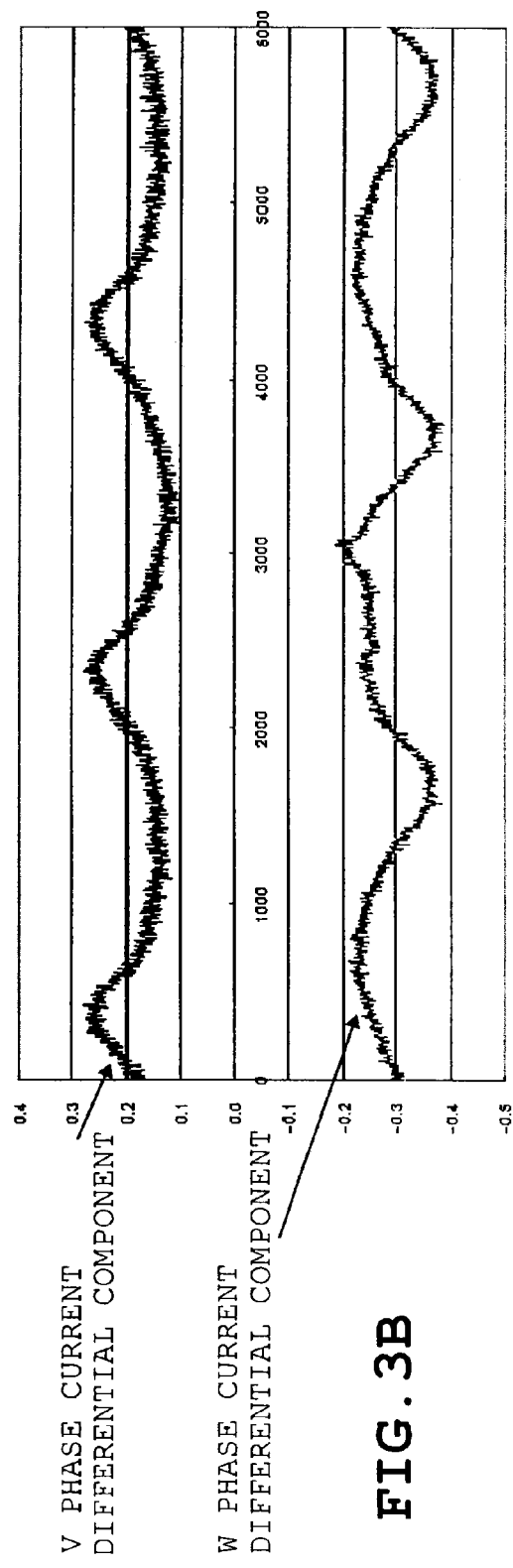

FIGS. 3A and 3B show a magnetic pole position detected by a position sensor in the embedded magnet type permanent magnet synchronous motor (3A) and two phase current differential values in the application of a PWM signal pattern of the embodiment (3B). As shown, the current differential value changes by 2θ that is twice as large as the magnetic pole position θ. Since the current differential value contains information indicative of a magnetic pole position of a salient pole electric motor, the magnetic pole position can be computed from the two-phase current differential value.

Figure 2:
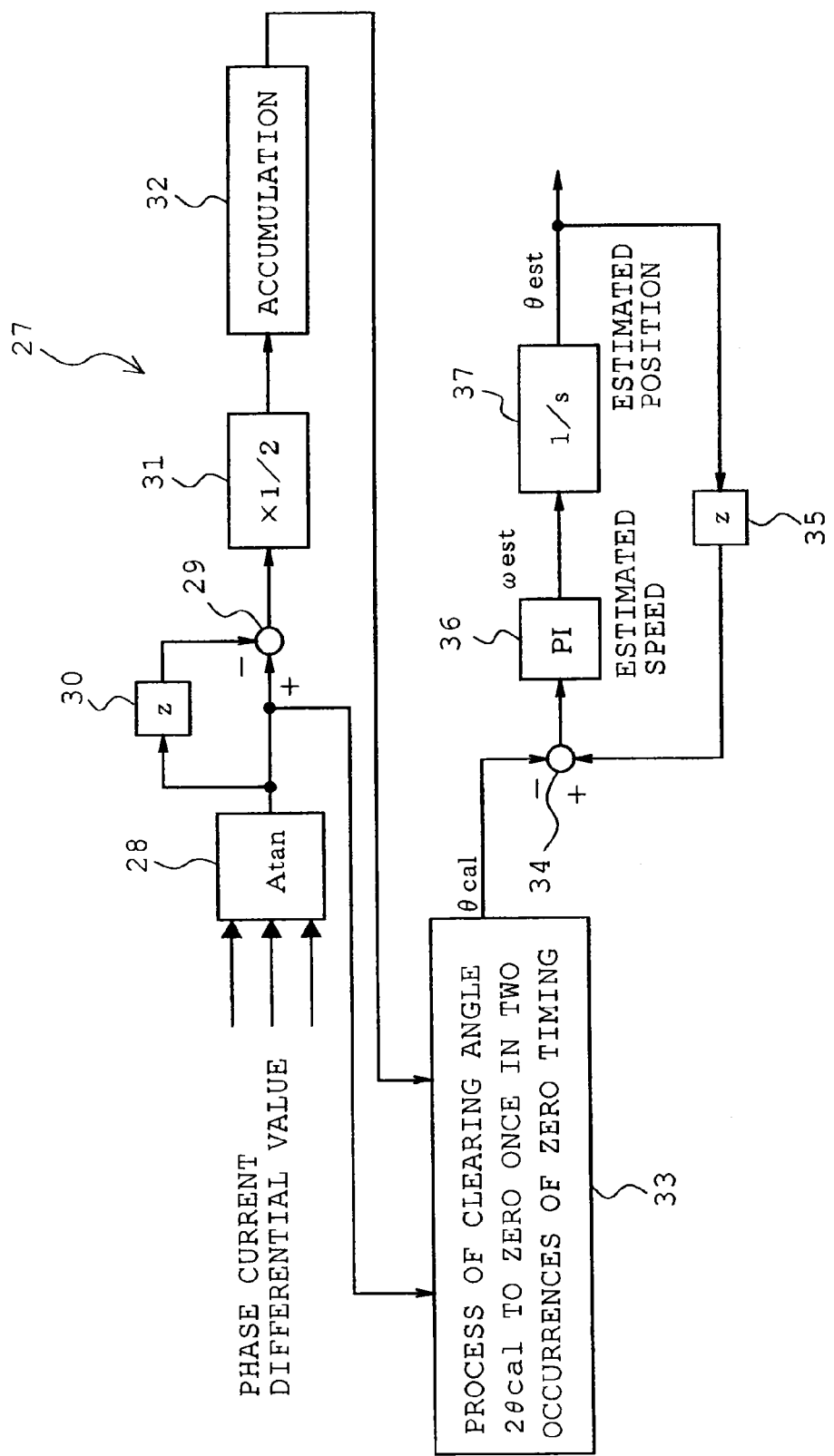
FIG. 2 is a block diagram showing the magnetic pole position estimation in detail.

There are various manners of computing a magnetic pole position from the current differential value. For example, FIG. 2 shows one of the computing manners and is a functional block diagram showing the magnetic pole position estimation 27 in detail. An angle computation (Atan) 28 executes computation using the following equation on the basis of three-phase differential values in order to obtain an angle $2\theta_{cal}$ twice as large:

$$2\theta_{cal} = \tan^{-1}[\{Iu' - (1/2)(Iv' + Iw')\}/(\sqrt{3}/2)(Iv' - Iw')] \quad (1)$$

A next stage or subtraction 29 obtains a difference (a differential value) between angle $2\theta_{cal}$ and the computational result ($2\theta_{cal}$) delayed via a delay device 30 and obtained one computation period before. The obtained difference is rendered 0.5 times as large by a further next stage of a multiplier 31. Output of the multiplier 31 is accumulated by an accumulator 32, and a result of accumulation is stored in a zero clear 33. Although an angle $\theta_{cal}$ is obtained that corresponds to a half of the double angle $2\theta_{cal}$, the angle $\theta_{cal}$ that is an accumulated value is cleared to zero every other timing of zero angle $2\theta_{cal}$.

A subtractor 34 at a next stage obtains a difference between the angle $\theta_{cal}$ and the last computational result ($\theta_{est}\_1$) delayed via a delay device 35 and obtained one computation period before. The obtained difference is supplied to a PI control 36, from which an estimated speed $\omega_{est}$ is obtained. An integrator 37 integrates the estimated speed $\omega_{est}$ thereby to obtain an estimated magnetic pole value $\theta_{est}$.

In the above-described embodiment, when the MOSFETs 5U±, 5V± and 5W± are on-off controlled according to the predetermined PWM signal pattern, the shunt resistance 4 is connected to the DC bus bar 2b side of the inverter circuit 3. The PWM signal generation 9 generates the three-phase PWM signal pattern so that the signal pattern follows the magnetic pole position $\theta_{est}$ of the motor 6. When the current detection 7 detects the phase currents based on the signal generated by the shunt resistance 4R and the PWM signal pattern, the PWM signal generation 9 generates the three-phase PWM signal pattern so that the current detection unit 7 is capable of detecting two-phase currents twice in synchronization with the four time-points within the carrier wave period of the PWM signal.

The current differential 25 supplies, as the current differentials, the differences between twice detected currents for each one of the two phases. The current differential 25 also supplies, as the current differential, the difference between the currents obtained by computation regarding the remaining phase in the same manner as described above. The magnetic pole position estimation 27 estimates the magnetic pole position $\theta_{est}$ of the motor 6 based on the current differentials. Accordingly, the magnetic pole position $\theta_{est}$ can precisely be estimated by a position sensorless method even in a very low speed region including zero speed without dependence upon electrical characteristics of the motor 6, whereupon the estimating manner can easily be applied to various types of systems.

In this case, the PWM signal generation 9 increases/decreases the duty cycle in both directions of phase lag and phase lead on the basis of any phase in the carrier period regarding one (a first phase) of the three-phase PWM signals. Regarding another phase (a second phase), the PWM signal generation 9 increases/decreases the duty cycle in the direction of either phase lag or phase lead on the basis of any phase in the carrier period. Regarding the other phase (a third phase), the PWM signal generation 9 increases/decreases the duty cycle in the direction opposite that of the second phase on the basis of any phase in the carrier period.

Accordingly, when the phase current detection 7 detects current, the detection timing is set within a first period when the switching elements of the first and second phases are simultaneously ON and within a second period when the switching elements of the first and third phases are simultaneously ON. As a result, the third phase current can be detected in the first period, and the second phase current can be detected in the second period. Since the PWM signal generation 9 sets the phase references based on phases in which the carrier amplitude becomes maximum or minimum, the timing of current detection by the current detection 7 can also be set easily based on the aforementioned phases.

Furthermore, the PWM signal generation 9 uses as the carrier the triangle wave regarding U phase of the three-phase PWM signals. Regarding V phase, the PWM signal generation 9 uses as the carrier the first sawtooth wave in which the phase indicative of the maximum amplitude corresponds with the phase indicative of the maximum or minimum amplitude of the triangle wave. Regarding W phase, the PWM signal generation 9 uses as the carrier the second sawtooth wave having the phase opposite that of the sawtooth wave regarding the V phase. The references of the phases are set on the basis of the phase in which the maximum or minimum values of the carrier amplitude correspond with one another. Consequently, the carriers having different waveforms are used for respective phases, whereby phase direction in which duty cycle of each phase PWM signal is increased/decreased can be changed.

Figure 10:
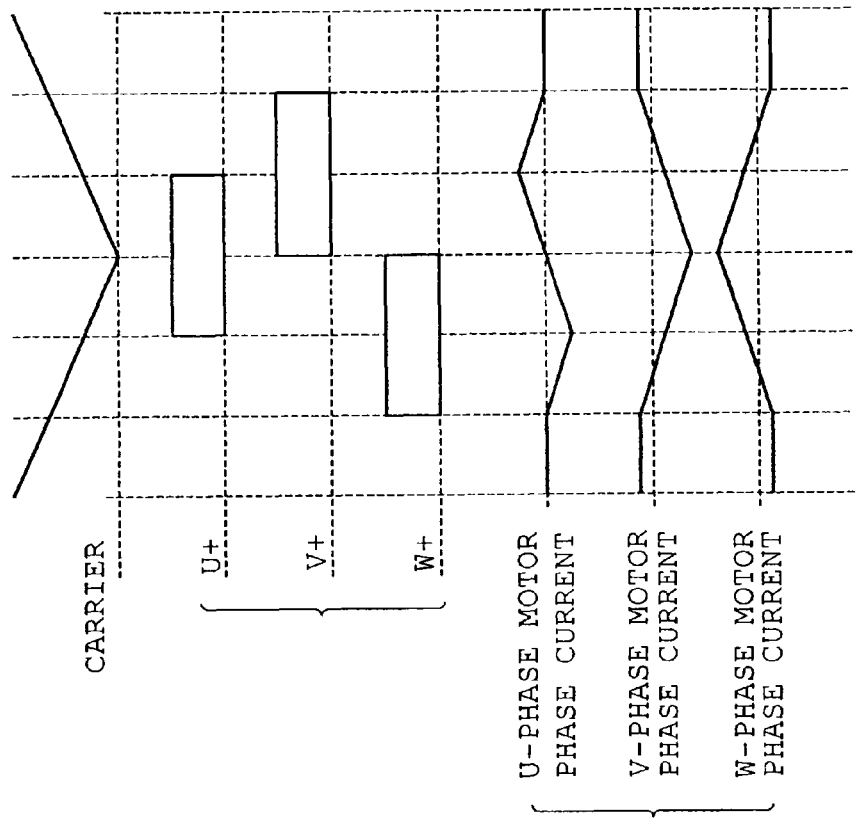
FIGS. 10A to 10C are views similar to FIGS. 5A to 5D in the case where three-phase PWM duty cycles are equally reduced, showing a second embodiment.

FIGS. 10A to 10C illustrate a second embodiment. Identical or similar parts in the second embodiment are labeled by the same reference symbols as those in the first embodiment and the description of these parts will be eliminated. Only the difference between the first and second embodiments will be described. In the second embodiment, duty cycles of the three-phase PWM signal pattern are adjusted by the duty cycle increase/decrease 11 incorporated in the PWM signal generation 9. The accuracy in the estimation of magnetic pole position becomes higher and a signal/noise (S/N) ratio becomes larger as the current differential is large in the estimation system of the second embodiment. On the other hand, an excessively large current differential value leads to an increase in the noise according to PWM carrier frequency or electromagnetic noise.

As shown in FIGS. 10A to 10C, high-frequency current amplitude (current differential values) is decreased when all phase duty cycles are uniformly decreased relative to the pattern in FIGS. 5A to 5C. When the pattern is adjusted in this manner, the high-frequency current amplitude has a value intermediate between those of the cases as shown in FIGS. 4A-4D and 5A-5D. On the contrary, when all phase duty cycles are uniformly increased, the pattern can be adjusted so that the high-frequency current amplitude is increased. For example, when the PWM frequency exceeds the value of about 15 kHz, the noise due to the frequency is at such a low level as to be actually unrecognizable in the human audible range. Accordingly, the influence of noise tends to be reduced. Thus, when control is carried out in the frequency range as mentioned above, the duty cycle adjustment is desirable to be carried out in such a manner that all phase duty cycles are uniformly increased for the purpose of improving an estimation accuracy of the magnetic pole position.

Accordingly, information about the frequency of PWM carrier is supplied to the duty cycle increase/decrease 11 so that duty cycle adjustment is carried out in such a manner that all phase duty cycles are uniformly increased/decreased according to a level of the frequency. Furthermore, with uniform increase/decrease of all phase duty cycles, the timing for current detection by the current detection 7 needs to be adjusted. When the duty cycles have been increased, the sections between time-points $Tv_1$ and $Tv_2$ and time-points $Tw_1$ and $Tw_2$ are adjusted so as to be increased accordingly. More specifically, the time-point $Tv_1$ is adjusted so as to be shifted further to the phase lag side and the time-point $Tw_1$ is adjusted so as to be shifted further to the phase lead side, whereby the S/N ratio is improved.

Furthermore, the above-described adjustment to uniformly increase/decrease the duty cycles of all phases is also carried out in the same manner regarding a rotational speed of the motor 6. More specifically, when the rotational speed is in a lower range, the duty cycles of all phases are kept uniformly increased so that the S/N ratio is improved. Since the influence of noise or the like is relatively lowered with increase in the rotational speed, the duty cycles of all phases are decreased stepwise, for example, for every 100 rpm in the case where the motor has a maximum rotational speed of about 5000 rpm. In this case, the estimated speed $\omega_{est}$ is supplied to the duty cycle increase/decrease 11.

Furthermore, when the duty cycles of all phases are uniformly increased/decreased, the four current detection time-points are adjusted according to the increase/decrease of the duty cycles. For example, when the duty cycles are to be added, the detection section between time-points $Tv_1$ and $Tv_2$ is adjusted so as to be increased.

In the above-described second embodiment, the duty cycle increase/decrease 11 uniformly increases duty cycles of three-phase PWM signal pattern with increase in the carrier frequency of the PWM signal. Consequently, the S/N ratio in the current detection can be improved with decrease in the influence of carrier frequency on the human auditory sense, and the accuracy in the estimation of magnetic pole position $\theta_{est}$ can be improved by adjustment of high-frequency current amplitude. Additionally, since the duty cycle increase/decrease 11 uniformly decreases duty cycles of the three-phase PWM signal pattern according to increase in the rotational speed $\omega_{est}$ of the motor 6, suitable duty cycles can be set according to the rotational speed, whereupon loss in electric power and magnetic noise can be reduced.

Figure 11:
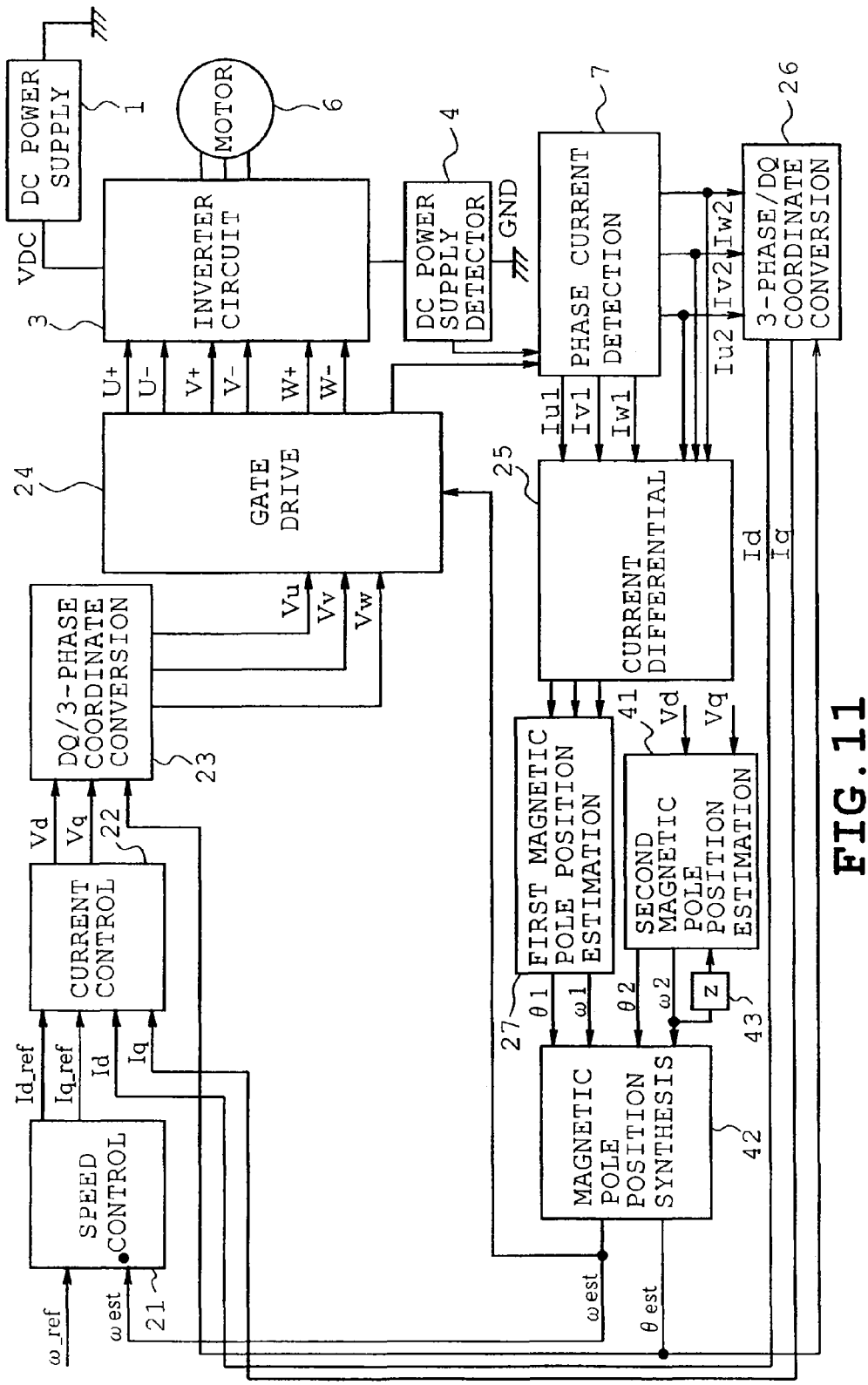
FIG. 11 is a view similar to FIG. 1, showing a third embodiment.
Figure 12:
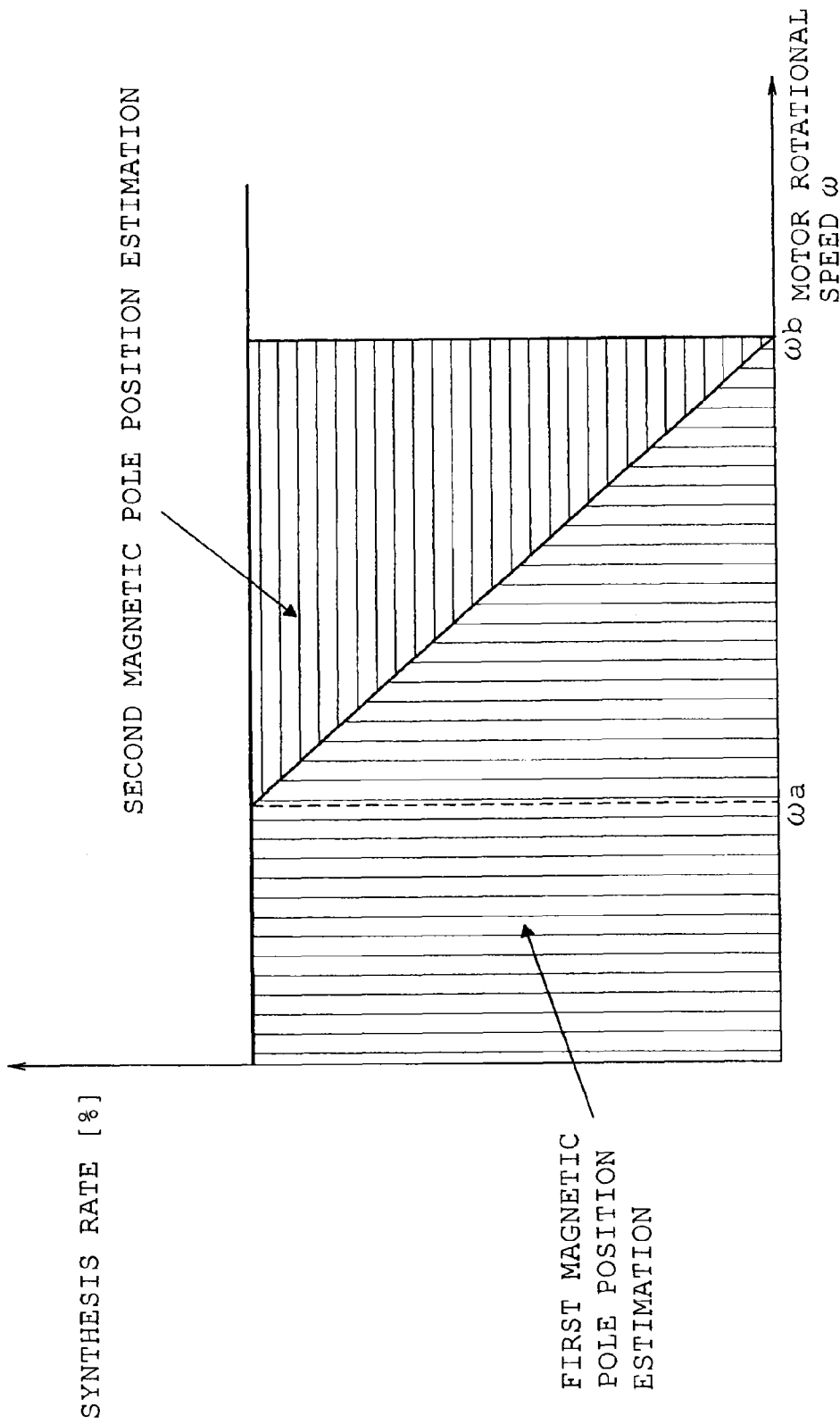
FIG. 12 shows a manner of synthesizing two sets of magnetic pole positions and rotational speeds in the magnetic pole position synthesis.
Figure 13:
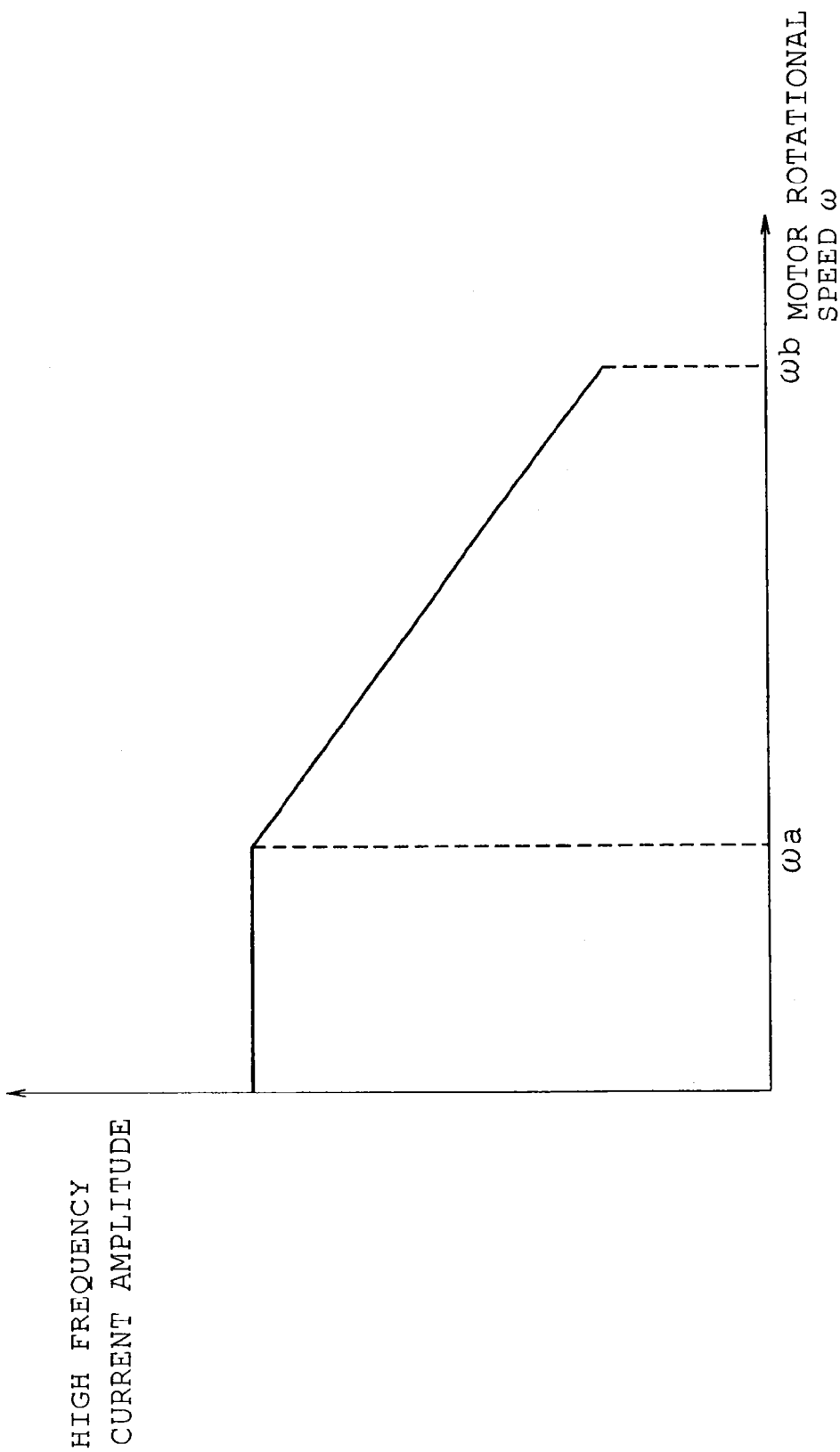
FIG. 13 is a graph showing a manner of equally changing three-phase PWM duty cycles according to the change in the rotational speed.

FIGS. 11 to 13 illustrate a third embodiment. Only the differences between the first and third embodiments will be described. In the third embodiment, the magnetic pole position estimation 27 employed in the first embodiment serves as a first magnetic pole position estimation 27, and another or a second magnetic pole position estimation 41 (a second magnetic pole position estimation unit, induced voltage detection unit) is provided. The second magnetic pole position estimation 41 computes an induced voltage based on d-axis voltage $V_d$, q-axis voltage $V_q$, d-axis current Id, q-axis current $I_q$ and electrical characteristics including inductance of motor 6 winding and resistance value, estimating the magnetic pole position $\theta_2$ and rotational speed $\omega 2$ of the motor 6 based on the obtained induced voltage. The second magnetic pole position estimation 41 has a known configuration similar to that disclosed in Japanese Patent No. 4751435 corresponding to U.S. Pat. No. 8,120,296 B2.

To a magnetic pole position synthesis 42 (a magnetic pole position synthesis unit) are supplied the magnetic pole position $\theta_1$ (a first magnetic pole position) and the rotational speed $\omega_1$ both estimated by the first magnetic pole position estimation 27 and the magnetic pole position $\theta_2$ (a second magnetic pole position) and the rotational speed $\omega_2$ both estimated by the second magnetic pole position estimation 41. Furthermore, the estimated speed $\omega 2$ generated by the second magnetic pole position estimation 41 is fed back to the second magnetic pole position estimation 41 via a delay device 43 which imparts a delay time of one computation period for use in the estimation computation.

FIG. 12 shows a manner of synthesizing the magnetic pole position $\theta_1$ and rotational speed $\omega_1$ both obtained by the first magnetic pole position estimation 27 and the magnetic pole position $\theta_2$ and the rotational speed $\omega_2$ both obtained by the second magnetic pole position estimation 41. The abscissa axis in FIG. 12 denotes a rotational speed of the motor 6, and the ordinate axis denotes a synthesis rate of the magnetic pole position $\theta_1$ and rotational speed $\omega 1$ (the synthesis rate 0% of the ordinate axis denotes the synthesis rate 100% of the magnetic pole position $\theta_2$ and rotational speed $\omega_2$). The magnetic pole position synthesis 42 selects only the magnetic pole position $\theta_1$ and rotational speed $\omega_1$ regarding a low speed range below a rotational speed $\omega a$ (at synthesis rate 100%), generating a magnetic pole position $\theta_{est}$ (a third magnetic pole position) and a rotational speed $\omega_{est}$ as results of estimation. The threshold $\omega a$ of the rotational speed corresponds to a lowest value allowing estimation by the second magnetic pole position estimation 41 on the basis of the induced voltage detection system.

When the rotational speed is increased to be equal to or above $\omega a$, the synthesis rate is decreased from 100% and the synthesis rate of the magnetic pole position $\theta 2$ and rotational speed $\omega_2$ by the second magnetic pole position estimation 41 is increased by an amount corresponding to the aforementioned decrease. The synthesis rate becomes 0% when the rotational speed reaches $\omega_b$. Subsequently, the magnetic pole position $\theta_2$ and rotational speed $\omega_2$ by the second magnetic pole position estimation 41 are supplied so as to become the magnetic pole position $\theta_{est}$ and rotational speed $\omega_{est}$ without any change.

FIG. 13 shows a mode in which the duty cycle increase/decrease 11 in the PWM signal generation 9 uniformly changes three-phase PWM duty cycles, that is, the high-frequency current amplitude according to the change in the rotational speed of the motor 6 in the same manner as in FIG. 12. The high-frequency current amplitude is set at a large value in the low rotational speed range below $\omega a$, whereby the accuracy in the estimation by the first magnetic pole position estimation 27 is improved. When the rotational speed is increased to be equal to or above $\omega a$, the results of estimation by the second magnetic pole position estimation 41 are synthesized with the synthesis rate being gradually increased. Thus, the high-frequency current amplitude is gradually increased according to the increase in the rotational speed, whereupon loss in electric power and magnetic noise can be reduced.

In the above-described third embodiment, the second magnetic pole position estimation 41 is provided for carrying out the estimation of magnetic pole position on the basis of the induced voltage separately from the first magnetic pole position estimation 27. When the motor speed is in the low speed range below the rotational speed $\omega_a$, the magnetic pole position synthesis 42 selects only the magnetic pole position $\theta_1$ and rotational speed $\omega_1$ to supply the magnetic pole position $\theta_{est}$ and the rotational speed $\omega_{est}$. When the motor speed is increased to be equal to or above $\omega_a$, the synthesis rate is decreased from 100%, and the synthesis rate of the magnetic pole position $\theta_2$ and rotational speed $\omega_2$ by the second magnetic pole position estimation 41 is increased by an amount corresponding to the aforementioned decrease. The synthesis rate becomes 0% when the rotational speed reaches $\omega_b$. Subsequently, the magnetic pole position $\theta_2$ and rotational speed $\omega_2$ by the second magnetic pole position estimation 41 are supplied so as to become the magnetic pole position $\theta_{est}$ and rotational speed $\omega_{est}$ without any change.

More specifically, the results of estimation by the first magnetic pole position estimation 27 is employed when the motor speed is in the low speed range regarding which the position estimation by the second magnetic pole position estimation 41 is difficult. When the rotational speed of the motor 6 is increased to be equal to or above the threshold $\omega_a$, the synthesis rate of the estimation results by the second magnetic pole position estimation 41 is increased. Since the duty cycle increase/decrease 11 in the PWM signal generation 9 uniformly decreases the duty cycles of three-phase PWM signal pattern, the high-frequency current amplitude is increased in the range where the synthesis rate of the estimation results by the first magnetic pole position estimation 27 is high, whereby the estimation accuracy is improved. Furthermore, loss in electric power and magnetic noise can be reduced according to an increase in the synthesis rate of the estimation results by the second magnetic pole position estimation 41.

Figure 14:
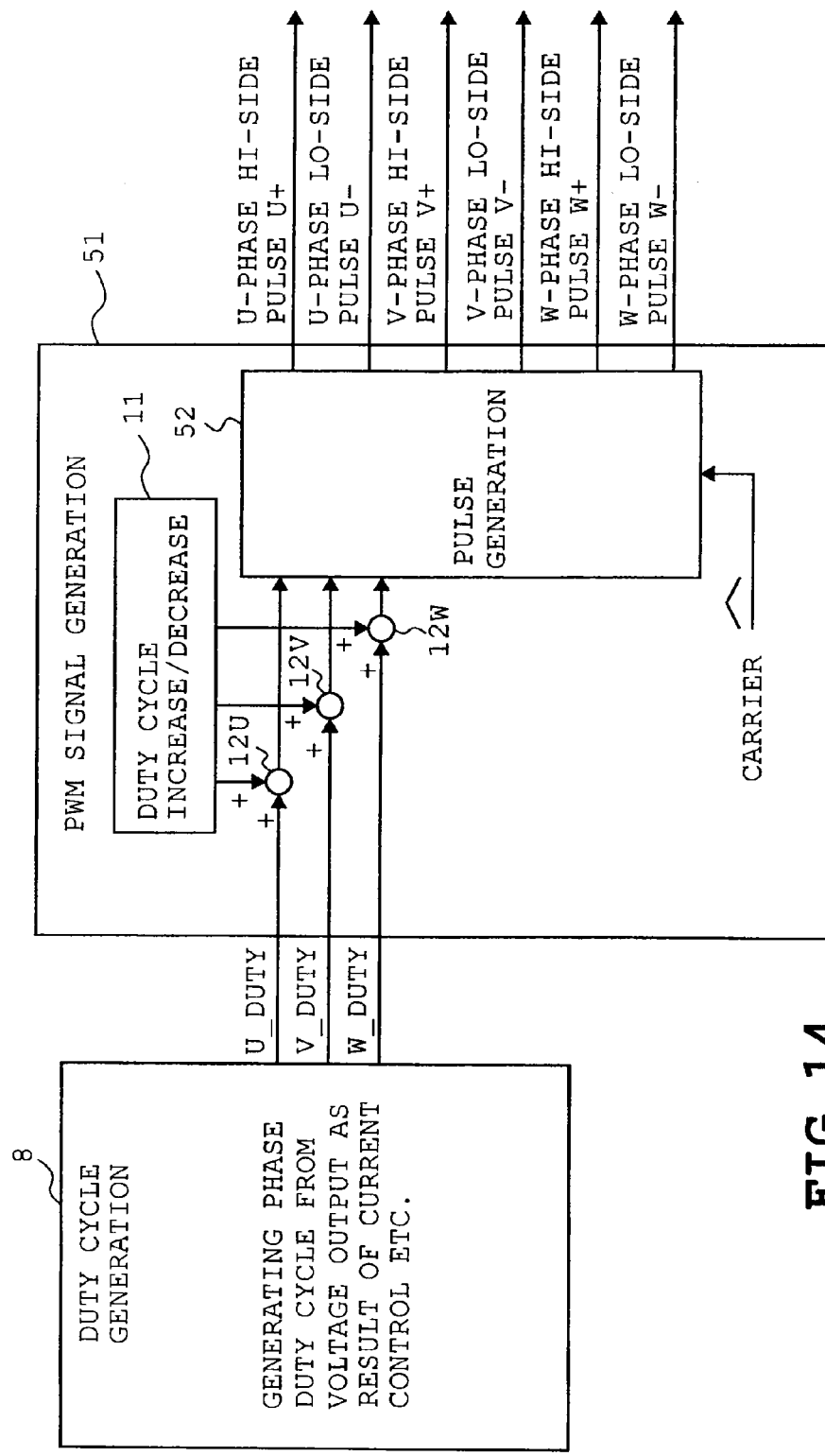
FIG. 14 is a view similar to FIG. 8, showing a fourth embodiment.

FIGS. 14 to 16 illustrate a fourth embodiment. FIG. 14 is similar to FIG. 2 and shows the configuration of a PWM signal generator 51 (a PWM signal generation unit) employed instead of the PWM signal generation 9. The PWM signal generator 51 includes a pulse generator 52 employed instead of the pulse generator 13. The pulse generator 51 executes a logical operation to shift three-phase PWM signal pulses in the same manner as in the first embodiment by the use of only one triangle wave carrier.

FIGS. 15A and 15B show a manner of generating three-phase PWM signal pulses by comparing respective phase duty cycles U_DUTY, V_DUTY and W_DUTY with the single carrier. In FIG. 15A, the solid line designates U-phase duty cycle U_DUTY, the broken line designates V-phase duty cycle V_DUTY and the dashed-dotted line designates W-phase duty cycle W_DUTY. Regarding the U phase, PWM signal pulses are supplied in a period when a duty cycle command U_DUTY is higher than the carrier. The section in which the carrier amplitude is increased is referred to as "first section." The section in which the carrier amplitude is decreased is referred to as "second section." Regarding the V phase, PWM signal pulses are supplied when a duty cycle command V_DUTY is higher than the carrier in the first section. PWM signal pulses are supplied when the duty cycle command V_DUTY is lower than the carrier in the second section. Regarding the W phase, PWM signal pulses are supplied when a duty cycle command W_DUTY is lower than the carrier in the first section. PWM signal pulses are supplied when the duty cycle command W_DUTY is higher than the carrier in the second section. As a result, an output pattern of three-phase PWM signal pulses with respect to the triangle wave carrier is the same as that in the first embodiment. FIG. 16 shows logic of signal processing executed by a pulse generator 52.

The following describes the setting of three-phase duty cycles. As an example, each of the U and W phase duty cycles U_DUTY and W_DUTY is set at 80%, the V phase duty cycle is set at 30% and the maximum amplitude of the carrier is set at 100%. Regarding the U phase, high level pulses are supplied in a period when a duty cycle command U_DUTY is normally lower than the carrier. The duty cycle command U_DUTY added with the processing by the duty cycle increase/decrease 11 is compared with the carrier in each of sections 1 and 2 while being maintained at 80% (U_DUTY=U_DUTY'). Consequently, high level pulses are supplied in the period of 80% duty cycle with the carrier valley being centered. Regarding the V phase, the value of 60% obtained by doubling V phase duty cycle V_DUTY added with the processing by the duty cycle increase/decrease 11 is compared with the carrier in the first section. The maximum value 100% of the carrier serving as V phase duty cycle V_DUTY is compared with the carrier in the second period. No pulses are supplied since the level of the phase duty cycle is lower than the carrier, although the carrier has the maximum value. Consequently, the V phase pulses are supplied in the period corresponding to 30% of the PWM period from the valley toward the peak of the carrier.

Finally regarding the W phase duty cycle W_DUTY, the value 40% is obtained by subtracting the value of 160% obtained by doubling the W phase DUTY value of 80% from a double of carrier MAX value of 100%. The obtained value 40% serving as the W phase duty cycle W_DUTY is compared with the carrier. As a result, pulses are generated with reference to the peak of the carrier. In the second section, the carrier MAX value 100% serving as the W phase duty cycle W_DUTY' is compared with the carrier. Accordingly, high level pulses are generated throughout the section. Consequently, high level W phase pulses are supplied in the period corresponding to 80% of the PWM period. Thus, the case of three-phase PWM signal pulses as shown in FIGS. 15A and 15B has been described. However, since the set values differ depending upon values of three-phase duty cycles, FIG. 16 shows a generalized logic for execution of conversion from DUTY to DUTY'.

More specifically, regarding the U phase, the U phase duty cycle U_DUTY is set as the set value without any change. Regarding V phase, when the doubled duty cycle U_DUTY is smaller than carrier maximum (MAX) value, the duty cycle V_DUTY' to be supplied in the first section is set at the aforementioned doubled value and the duty cycle V_DUTY to be supplied in the second section is set at the carrier MAX value. Furthermore, when the doubled value is larger than the carrier MAX value, the duty cycle V_DUTY' in the first section is set at the carrier MAX value, and the phase V duty cycle V_DUTY' in the second section is set at a value obtained by subtracting the aforementioned doubled value from the doubled carrier MAX value.

Regarding the W phase, when doubled duty cycle W_DUTY is smaller than the maximum value of carrier amplitude (carrier MAX value), the duty cycle W_DUTY' to be supplied in the first section is set at the carrier MAX value, and the duty cycle W_DUTY' to be supplied in the second section is set at the aforementioned doubled value. Furthermore, when the doubled value is larger than the carrier MAX value, the duty cycle W_DUTY' in the first section is set at a value obtained by subtracting the doubled value from the doubled carrier MAX value, and the duty cycle W_DUTY' in the second section is set at the carrier MAX value.

In the above-described fourth embodiment, the PWM signal generator 51 uses the triangle wave as the carrier. When the section in which the amplitude of the triangle wave is increased is referred to as "the first section" and the section in which the triangle wave amplitude is decreased is referred to as "the second section," the comparison condition on which the PWM signal is supplied as the result of comparison of the triangle wave amplitude and the PWM command is rendered constant through the first and second sections regarding the U phase. Regarding the V and W phases, comparison conditions in the first section differ from each other and comparison conditions in the second section are obtained by inverting the comparison conditions of the respective phases, whereby three-phase PWM signal pulses are generated.

The U phase duty cycle U_DUTY is set without any change, and the doubled V and W phase duty cycles V_DUTY and W_DUTY are each compared with the carrier MAX value. The V and W phase duty cycles V_DUTY' and W_DUTY' set for the first and second sections according to the comparison results are converted according to the logic as shown in FIG. 16. Accordingly, the fourth embodiment achieves the same effect as the first embodiment even when three types of carriers as employed in the first embodiment are not used.

The current detection 7 detects two phase currents within the carrier period. The timing of detection should not be based on the phase indicative of the minimum or maximum level of the carrier. The timing may be set on the basis of an arbitrary phase in a range allowing detection of two phase currents.

Furthermore, the timing of current detection should not correspond with the period of PWM carrier. For example, the current detection may be carried out with the use of a period that is twofold or fourfold longer than the carrier period. Accordingly, the current detection timing signal supplied to the current detection 7 need not be the carrier itself. For example, the timing signal may be a pulse signal that is synchronous with the carrier and has a predetermined period.

The shunt resistance 4 may be disposed on the positive bus bar 2a. Furthermore, the current detecting element should not be limited to the shunt resistance 4 but may be a current transformer (CT) or the like.

The switching device should not be limited to the n-channel MOSFET but may be a p-channel MOSFET, an insulated gate bipolar transistor (IGBT), a power transistor or the like.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A motor control device comprising:
    an inverter circuit including a plurality of switching elements which is connected into a three-phase bridge configuration, the switching elements being on/off controlled according to a predetermined PWM signal pattern so that direct current is converted to three-phase alternating current, which is supplied to drive an electric motor;
    a current detecting element connected to a direct current side of the inverter circuit to generate a signal corresponding to a current value;
    a current detection unit which detects a phase current of the motor based on the signal generated by the current detecting element and the PWM signal pattern;
    a PWM signal generation unit which generates a three-phase PWM signal pattern so that the current detection unit is capable of detecting two-phase currents twice in synchronization with four time-points within a carrier wave period of the PWM signal respectively and so that the current detection unit follows a magnetic pole position of the motor;
    a current differential unit which supplies, as current differential values, differences between twice detected current values regarding the two phases respectively; and
    a magnetic pole position estimation unit which estimates the magnetic pole position of the motor based on the current differential values, wherein:
    the PWM signal generation unit increases/decreases a duty cycle in both directions of phase lag and phase lead with an arbitrary phase within the carrier wave period serving as a reference regarding one phase of the three-phase PWM signal;
    the PWM signal generation unit increases/decreases the duty cycle in one of both directions of phase lag and phase lead with an arbitrary phase within the carrier wave period serving as a reference regarding another phase of the three-phase PWM signal; and
    the PWM signal generation unit increases/decreases the duty cycle in a direction opposed to said one of both directions of phase lag and phase lead with an arbitrary phase within the carrier wave period serving as a reference regarding the remaining phase of the three-phase PWM signal.

2. The motor control device according to claim 1, wherein the PWM signal generation unit sets the references of the phases based on a phase in which an amplitude of the carrier wave becomes maximum or minimum.

3. The motor control device according to claim 1, wherein:
    the PWM signal generation unit uses a triangle wave as the carrier wave;
    when a section in which an amplitude of the triangle wave is increased is referred to as a first section and a section in which the amplitude of the triangle wave is decreased is referred to as a second section, a comparison condition for supply of a PWM signal by comparison of magnitude correlation between an amplitude of the triangle wave and a PWM command is constant throughout the first and second sections, regarding one phase of the three-phase PWM signals;
    regarding the two other phases, comparison conditions differ from each other in the first section, and comparison conditions in the second section are obtained by inverting the comparison conditions in the first section;
    regarding the two other phases, doubles of respective set duty cycles are compared with the maximum value of the carrier wave amplitude;
    regarding one of the two other phases, when the double of the set duty cycle is smaller than the maximum value, the duty cycle of the PWM signal supplied in one of the first and second sections is set at the maximum value and the duty cycle of the PWM signal supplied in the other of the first and second sections is set at a double of the maximum value of the duty cycle in said one of the first and second sections;
when said double of the duty cycle is larger than the maximum value, the duty cycle of the PWM signal supplied in said one section is set at a value obtained by subtracting said double of the duty cycle from said double of the maximum value, and the duty cycle of the PWM signal supplied in the other section is set at the maximum value;
regarding said one of the two other phases, when the double of the duty cycle is smaller than the maximum value, the duty cycle of the PWM signal supplied in one of the first and section sections is set at said double of the duty cycle, and the duty cycle of the PWM signal supplied in the other of the first and second sections is set at said maximum value; and
when said double of the duty cycle is larger than the maximum value, the duty cycle of the PWM signal supplied in said one section is set at said maximum value, and the duty cycle of the PWM signal supplied in said other section is set at a value obtained by subtracting the duty cycle of the PWM signal supplied said other section from said double of the maximum value.

4. The motor control device according to claim 1, wherein:
the PWM signal generation unit uses a triangle wave as a carrier regarding one phase of the three phase PWM signal;
regarding another phase, the PWM signal generation unit uses a first saw-tooth wave as a carrier in which a phase indicative of a maximum amplitude corresponds with a phase indicative of a maximum or minimum amplitude of the triangle wave;
regarding the other phase, the PWM signal generation unit uses a second saw-tooth wave as a carrier, the second saw-tooth wave being opposite to the first saw-tooth wave in phase; and
bases of the respective phases are set based on a phase in which maximum and minimum amplitudes of the respective carriers correspond with one another.

5. The motor control device according to claim 1, wherein the PWM signal generation unit is configured to uniformly increase a duty cycle of the three-phase PWM signal pattern according to increase in a carrier frequency of the PWM signal.

6. The motor control device according to claim 1, wherein the PWM signal generation unit is configured to uniformly decrease a duty cycle of the three-phase PWM signal pattern according to increase in a rotational speed of the motor.

7. The motor control device according to claim 6, wherein the magnetic pole position estimation unit serves as a first magnetic pole position estimation unit, the motor control device further comprising:
an induced voltage detection unit which detects an induced voltage set up in a winding of the motor;
a second magnetic pole position estimation unit which estimates the magnetic pole position of the motor based on the induced voltage;
a magnetic pole position synthesis unit which executes drive control of the motor using a first magnetic pole position estimated by the first magnetic pole position estimation unit, until a rotational speed of the motor exceeds a predetermined threshold, the magnetic pole position synthesis unit executes drive control of the motor using a third magnetic pole position when the rotational speed of the motor exceeds the threshold, the third magnetic pole position being obtained by synthesizing, at a predetermined rate, the first magnetic pole position and a second magnetic pole position estimated by the second magnetic pole position estimation unit, so that a synthesis rate of the second magnetic pole position is increased according to increase in the rotational speed after excess of the threshold, the PWM signal generation unit uniformly decreasing the duty cycle of the three-phase PWM signal pattern when the rotational speed of the motor exceeds the threshold.

8. A motor control device comprising:
an inverter circuit including a plurality of switching elements which is connected into a three-phase bridge configuration, the switching elements being on/off controlled according to a predetermined PWM signal pattern so that direct current is converted to three-phase alternating current, which is supplied to drive an electric motor;
a current detecting element connected to a direct current side of the inverter circuit to generate a signal corresponding to a current value;
a current detection unit which detects a phase current of the motor based on the signal generated by the current detecting element and the PWM signal pattern;
a PWM signal generation unit which generates a three-phase PWM signal pattern so that the current detection unit is capable of detecting two-phase currents twice in synchronization with four time-points within a carrier wave period of the PWM signal respectively and so that the current detection unit follows a magnetic pole position of the motor;
a current differential unit which supplies, as current differential values, differences between twice detected current values regarding the two phases respectively; and
a magnetic pole position estimation unit which estimates the magnetic pole position of the motor based on the current differential values, wherein:
the PWM signal generation unit uses a triangle wave as the carrier wave;
when a section in which an amplitude of the triangle wave is increased is referred to as a first section and a section in which the amplitude of the triangle wave is decreased is referred to as a second section, a comparison condition for supply of a PWM signal by comparison of magnitude correlation between an amplitude of the triangle wave and a PWM command is constant throughout the first and second sections, regarding one phase of the three-phase PWM signals;
regarding the two other phases, comparison conditions differ from each other in the first section, and comparison conditions in the second section are obtained by inverting the comparison conditions in the first section; and
regarding the two other phases, doubles of respective set duty cycles are compared with the maximum value of the carrier wave amplitude;
regarding one of the two other phases, when the double of the set duty cycle is smaller than the maximum value, the duty cycle of the PWM signal supplied in one of the first and second sections is set at the maximum value and the duty cycle of the PWM signal supplied in the other of the first and second sections is set at a double of the maximum value of the duty cycle in said one of the first and second sections;
when said double of the duty cycle is larger than the maximum value, the duty cycle of the PWM signal supplied in said one section is set at a value obtained by subtracting said double of the duty cycle from said double of the maximum value, and the duty cycle of the PWM signal supplied in the other section is set at the maximum value;

regarding said one of the two other phases, when the double of the duty cycle is smaller than the maximum value, the duty cycle of the PWM signal supplied in one of the first and section sections is set at said double of the duty cycle, and the duty cycle of the PWM signal supplied in the other of the first and second sections is set at said maximum value; and when said double of the duty cycle is larger than the maximum value, the duty cycle of the PWM signal supplied in said one section is set at said maximum value, and the duty cycle of the PWM signal supplied in said other section is set at a value obtained by subtracting the duty cycle of the PWM signal supplied said other section from said double of the maximum value.

9. The motor control device according to claim 8, wherein the PWM signal generation unit is configured to uniformly increase a duty cycle of the three-phase PWM signal pattern according to increase in a carrier frequency of the PWM signal.

10. The motor control device according to claim 8, wherein the PWM signal generation unit is configured to uniformly decrease a duty cycle of the three-phase PWM signal pattern according to increase in a rotational speed of the motor.

11. The motor control device according to claim 10, wherein the magnetic pole position estimation unit serves as a first magnetic pole position estimation unit, the motor control device further comprising:

an induced voltage detection unit which detects an induced voltage set up in a winding of the motor;

a second magnetic pole position estimation unit which estimates the magnetic pole position of the motor based on the induced voltage;

a magnetic pole position synthesis unit which executes drive control of the motor using a first magnetic pole position estimated by the first magnetic pole position estimation unit, until a rotational speed of the motor exceeds a predetermined threshold, the magnetic pole position synthesis unit executes drive control of the motor using a third magnetic pole position when the rotational speed of the motor exceeds the threshold, the third magnetic pole position being obtained by synthesizing, at a predetermined rate, the first magnetic pole position and a second magnetic pole position estimated by the second magnetic pole position estimation unit, so that a synthesis rate of the second magnetic pole position is increased according to increase in the rotational speed after excess of the threshold, the PWM signal generation unit uniformly decreasing the duty cycle of the three-phase PWM signal pattern when the rotational speed of the motor exceeds the threshold.

12. A motor control device comprising:

an inverter circuit including a plurality of switching elements which is connected into a three-phase bridge configuration, the switching elements being on/off controlled according to a predetermined PWM signal pattern so that direct current is converted to three-phase alternating current, which is supplied to drive an electric motor;

a current detecting element connected to a direct current side of the inverter circuit to generate a signal corresponding to a current value;

a current detection unit which detects a phase current of the motor based on the signal generated by the current detecting element and the PWM signal pattern;

a PWM signal generation unit which generates a three-phase PWM signal pattern so that the current detection unit is capable of detecting two-phase currents twice in synchronization with four time-points within a carrier wave period of the PWM signal respectively and so that the current detection unit follows a magnetic pole position of the motor;

a current differential unit which supplies, as current differential values differences between twice detected current values regarding the two phases respectively; and a magnetic pole position estimation unit which estimates the magnetic pole position of the motor based on the current differential values, wherein:

the PWM signal generation unit uses a triangle wave as a carrier regarding one phase of the three phase PWM signal;

regarding another phase, the PWM signal generation unit uses a first saw-tooth wave as a carrier in which a phase indicative of a maximum amplitude corresponds with a phase indicative of a maximum or minimum amplitude of the triangle wave;

regarding the other phase, the PWM signal generation unit uses a second saw-tooth wave as a carrier, the second saw-tooth wave being opposite to the first saw-tooth wave in phase; and bases of the respective phases are set based on a phase in which maximum and minimum amplitudes of the respective carriers correspond with one another.

13. The motor control device according to claim 12, wherein the PWM signal generation unit is configured to uniformly increase a duty cycle of the three-phase PWM signal pattern according to increase in a carrier frequency of the PWM signal.

14. The motor control device according to claim 12, wherein the PWM signal generation unit is configured to uniformly decrease a duty cycle of the three-phase PWM signal pattern according to increase in a rotational speed of the motor.

15. The motor control device according to claim 14, wherein the magnetic pole position estimation unit serves as a first magnetic pole position estimation unit, the motor control device further comprising:

an induced voltage detection unit which detects an induced voltage set up in a winding of the motor;

a second magnetic pole position estimation unit which estimates the magnetic pole position of the motor based on the induced voltage;

a magnetic pole position synthesis unit which executes drive control of the motor using a first magnetic pole position estimated by the first magnetic pole position estimation unit, until a rotational speed of the motor exceeds a predetermined threshold, the magnetic pole position synthesis unit executes drive control of the motor using a third magnetic pole position when the rotational speed of the motor exceeds the threshold, the third magnetic pole position being obtained by synthesizing, at a predetermined rate, the first magnetic pole position and a second magnetic pole position estimated by the second magnetic pole position estimation unit, so that a synthesis rate of the second magnetic pole position is increased according to increase in the rotational speed after excess of the threshold, the PWM signal generation unit uniformly decreasing the duty cycle of the three-phase PWM signal pattern when the rotational speed of the motor exceeds the threshold.

* * * * *